Figure 1:
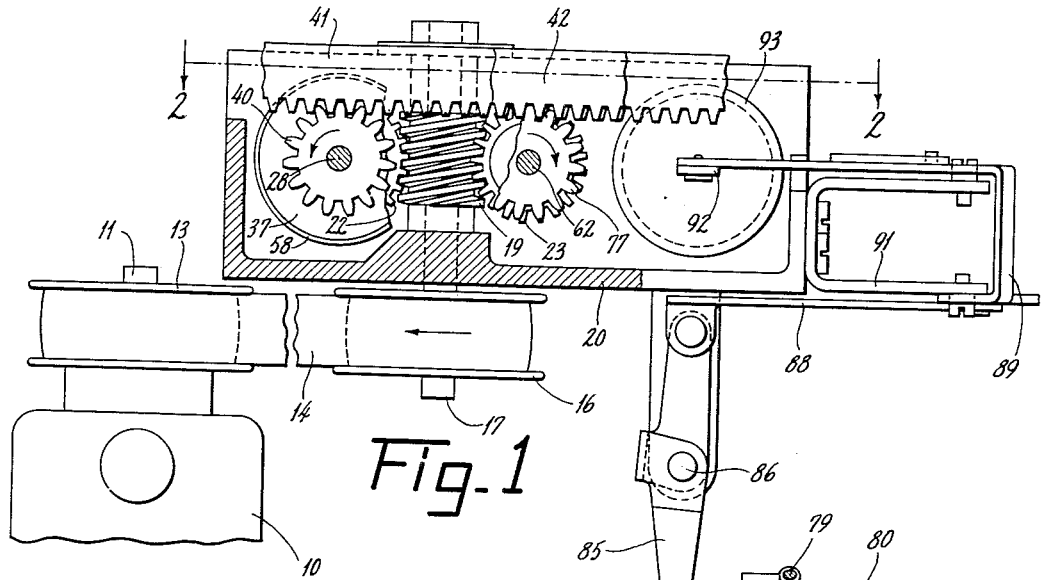

Oct. 18, 1955  W. A. ANDERSON  2,720,960
CARRIAGE DRIVE MECHANISM
Filed Oct. 16, 1952  2 Sheets-Sheet 1

INVENTOR.
WALTER A. ANDERSON
BY
Jesse A. Holton
ATTORNEY

Oct. 18, 1955     W. A. ANDERSON     2,720,960
CARRIAGE DRIVE MECHANISM
Filed Oct. 16, 1952     2 Sheets-Sheet 2
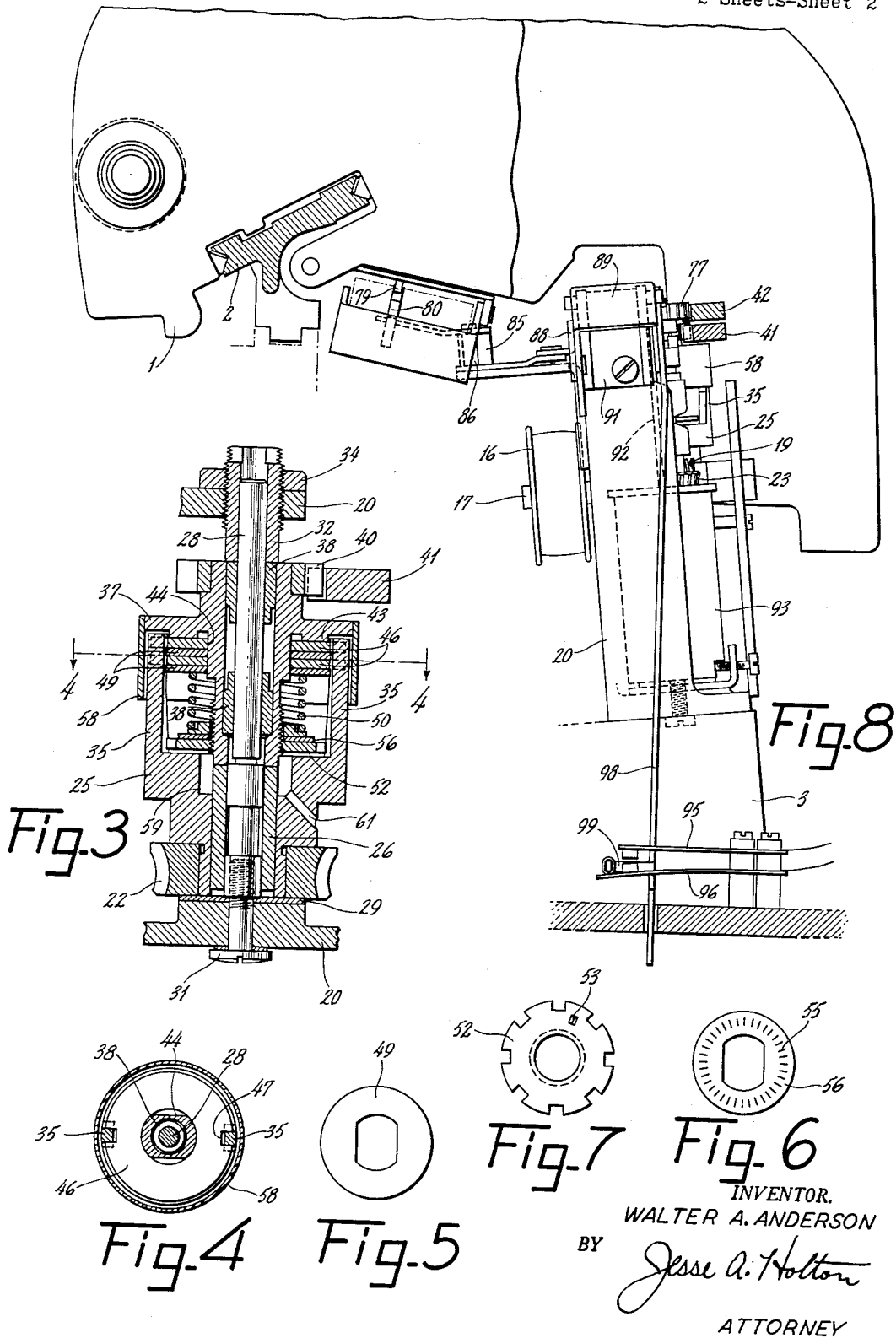
INVENTOR.
WALTER A. ANDERSON
BY
Jesse A. Holton
ATTORNEY

United States Patent Office 2,720,960
Patented Oct. 18, 1955

2,720,960
CARRIAGE DRIVE MECHANISM

Walter A. Anderson, Trumbull, Conn., assignor to Underwood Corporation, New York, N. Y., a corporation of Delaware Application October 16, 1952, Serial No. 315,160

1 Claim. (Cl. 197—66)

This invention relates to an accounting machine of the type having a tabulating carriage and more particularly to means for driving the carriage of such a machine in a tabulating direction. The present invention is an improvement over the mechanism shown in U. S. Patents Nos. 2,023,294, issued December 1935, to O. J. Sundstrand and 2,536,524, issued January 2, 1951, to W. A. Anderson.

In modern accounting machines, the use of wide work sheets and multiple forms requires the provision of a large and heavy paper carriage. A strong carriage drive spring is needed for such a carriage and although a carriage speed limiting device is provided, the strong spring at its maximum required tension subjects the carriage arresting stops to severe impact and shock.

One solution which would avoid such impact and shock is the provision of a device which will provide a constant and uniform driving force to the carriage at any of its positions. In the first patent above noted, such a force is applied through a friction clutch constantly driven from the motor and driving the carriage through a draw band. This solution is not satisfactory due to the wear on the friction clutch and the constant tension maintained in the draw band while the carriage is arrested. Such tension in the draw band and the resilience of the band cause the carriage, which is of course mounted on anti-friction rollers, to accelerate rapidly when released to a greater than normal speed. The carriage will then overrun the draw band causing the band to leave its guide rollers and become jammed. Also, for a short period, the carriage speed is excessive causing the above noted shock if the carriage is arrested during this time.

The present invention provides a friction drive for the tabulation of the carriage which drive is of uniform force, does not permit an excessive carriage speed and is not subject to abnormal wear on the parts, thus providing a smooth dependable carriage drive with minimum shock. Such drive is effected by the motor which operates the carriage return drive and actuates the machine, resulting in an economical device.

It is, then, an object of the present invention to provide a means whereby the carriage may be driven in its working or tabulating movement and its return movement by a single motor.

Another object of the present invention is to provide a unitary means for both driving and controlling the speed of the carriage in its working or tabulating movement and its return movement by a single motor.

Another object of the present invention is to provide a unitary means for both driving and controlling the speed of the carriage in its working or tabulating movement.

It is also an object of the present invention to reduce shock incident to the arresting of the carriage during its working or tabulatory movement.

A further object of the invention is to prevent overthrow of the carriage in its return movement.

A still further object of the invention is to provide a means for driving the carriage in both its working and return movements that is simple in construction, reduces cost of manufacture of the machine, is easy to assemble in the machine and to service in the field, and is highly efficient in operation.

With these and incidental objects in view, the invention consists in certain novel features of construction and combinations of parts, the important elements of which are set forth in appended claims, and a preferred form of embodiment of which is hereinafter described with reference to the drawings which accompany and form part of the specification.

Figure 2:
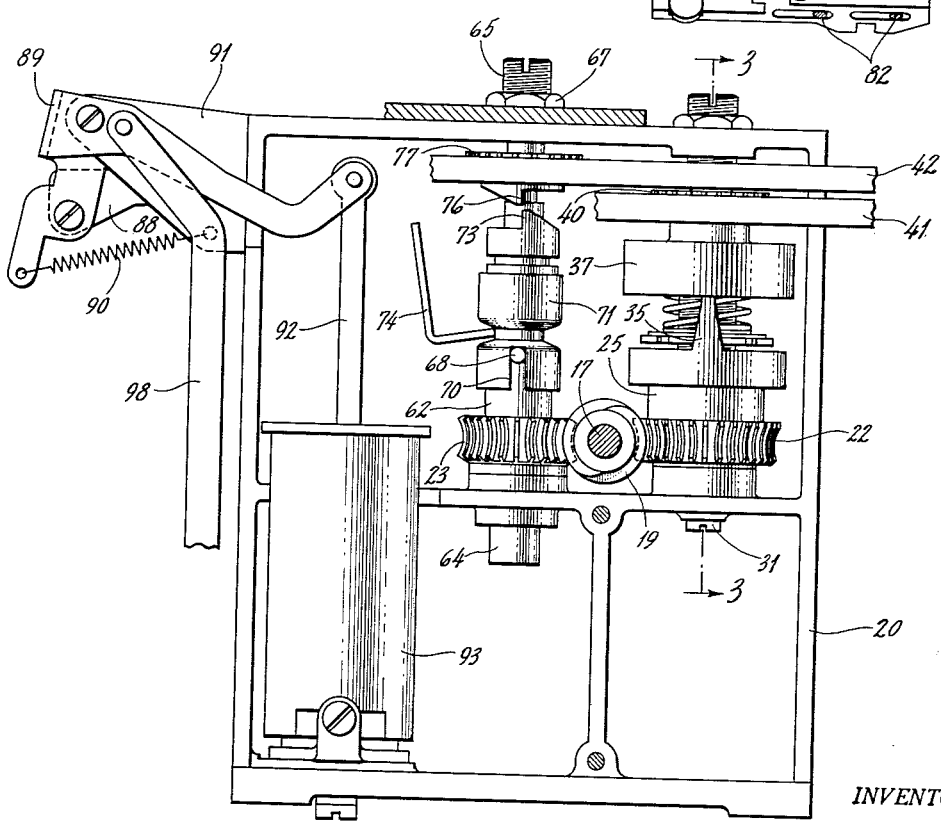

In the drawings:

Figure 1 is a fragmentary plan view, partly in section, illustrating the motor drive for tabulating and returning the carriage, and for controlling the tabulating speed of the carriage, Figure 2 is a sectional rear view taken on line 2—2, of Figure 1, showing the power drives to the carriage, Figure 3 is a sectional view taken on line 3—3, of Figure 2, showing the friction drive for tabulating and controlling the tabulating speed of the carriage, Figure 4 is a sectional view taken on the line 4—4, Figure 3, Figures 5, 6 and 7 are detail views illustrating certain of the parts shown in Figure 3, and Figure 8 is a side view showing the relation of the new tabulating drive to the carriage.

The present invention is herein shown as embodied in an accounting machine of the well-known Sundstrand type, although it will be understood that the invention is not limited to machines of that particular type.

The machine includes a travelling paper carriage 1, Figure 8, similar to that illustrated and described in the Patent No. 2,536,524 previously referred to, and movable on a stationary rail 2, leftwardly, Figure 1, in its working or tabulating stroke, and rightwardly in its return stroke.

The present invention provides means for moving the carriage 1 in both directions by means of a single motor. Referring to Figure 1 of the drawings, the motor 10 cycles the machine in the usual manner. Fixed on the motor shaft 11 is a pulley 13 connected by a belt 14 with a pulley 16 fixed on a shaft 17 of a worm 19. The worm 19 is journalled in a frame 20 mounted on the machine base 3, Figure 8, and rotates worm wheels 22 and 23 in a counter-clockwise and clockwise direction, respectively, as indicated by arrows, Figure 1.

Worm wheel 22 drives carriage 1 in its working or tabulating stroke. The worm wheel 22 is fixed on a body member 25, in which is secured a bearing 26, Figure 3, and all are rotatably supported on a vertical shaft 28. The shaft rests on a washer 29 and is secured to the frame 20 by a screw 31 at its lower end. At its upper end shaft 28 runs in an adjustable bearing 32 threaded in the frame 20 and locked in adjustment by a nut 34. The body member 25 carries two oppositely disposed upstanding lugs 35. A flanged upper body member 37 having bearings 38 is rotatably mounted on the shaft 28 and rests on the bearing 26 to just clear the upper surface of the lugs 35. A gear 40 meshing with the carriage tabulating rack 41 fixed in the travelling paper carriage is secured to the upper end of member 37.

The upper body member 37 and gear 40 are frictionally driven by the lower body member 25, to advance the carriage in its working or tabulating stroke, left in Figure 1. For such a frictional drive the upper body member 37 has a flanged bearing surface 43 and a hub 44 having two flat surfaces. Freely rotatable on the upper portion of hub 44 are a number of wear resistant metallic composition plates 46, see Figure 4, having a high coefficient of friction, and a low coefficient of heat transfer. The upper of these plates 46 bears on the bearing surface 43 of the upper body member 37 and all have notches 47, engaging the upstanding lugs 35 on the lower body member 25, as shown in Figures 3 and 4. Alternating with the plates 46 are an equal number of plain metal plates 49, Figures 3 and 5, keyed to the upper portion of hub 44 and rotatably free of the upstanding lugs 35. Pressure is applied to the plates 46 and 49 by a compression spring 50, compressed at its lower end by a nut 52, Figures 3 and 7, threaded on the hub 44 of upper body member 37. The nut 52 has an embossed nib 53 engaging notches 55 in a lock plate 56, Figures 3 and 6, keyed to the hub 44 to retain the nut 52 in its adjusted position.

As previously mentioned worm wheels 22 and 23 are rotated by the worm 19. These parts rotate only when the carriage is free of the tabulating arresting stops, not shown, since means to be later described are provided in the machine to open the electrical circuit of the motor upon the arrest of the carriage 1.

With the release of the carriage 1 from the arresting stops, to move in either direction, the electrical circuit of the motor is closed, and rotation of the wheels 22 and 23 is initiated. When the carriage 1 is released for tabulation, the frictional drive between parts 25 and 37 accelerates the carriage 1 without shock to the maximum safe speed. Upon the arrest of the carriage in tabulation by the tabulating stops and the opening of the motor circuit, there is a slight over-run of the motor 10 and body 25 due to inertia, during which over-run plates 46 slip on plates 49 and apply pressure against rack 41 holding the carriage firmly against the arresting stop. Upon the initiation of carriage return, however, carriage 1 is moved to the right, in Figure 1, causing the upper body member 37 to rotate in a direction opposite to the direction of rotation of body member 25, and slippage occurs between the plates 46 and 49.

It is important that plates 46 and 49 remain completely dry and free of foreign matter such as dust, lubricant, etc. In order to shield the plates from foreign matter which may accumulate from outside sources, a skirt 58 is secured to the upper body member 37 and extend downwardly to a point substantially below the lower plate 46. It is also important that the shaft 28 and bearings 26, 32 and 38 be kept well lubricated to prevent wear. In the device of the present invention, lubricant is applied at the top of shaft 28, and the shaft being vertically disposed, excess lubricant will tend to seep downwardly along the shaft and be dispelled therefrom by the rotation of the lower body member 25 where the upper body member 37 rests on the bearing 26. The excess lubricant would normally tend to gather on the nut 52, and gradually work upwardly to the plates 46 and 49. To prevent this, a well 59, Figure 3, is provided in the lower body member 25 to receive the excess lubricant. An outlet 61 extending from the well to the periphery of the member 25 enables the dispelling of the lubricant therefrom by centrifugal force.

By means of the mechanism described above, the carriage 1 is tabulated by power smoothly and at an even rate of speed, as controlled by the motor 10, from the instant of its release, and through any distance of travel. The drive being impositive, the shock usually incident to the arresting of the carriage is cushioned, and is thereby substantially reduced. Also, rebounding of the carriage from its arrested position is eliminated.

The carriage is positively returned by means of a mechanism similar to that disclosed in the Patent No. 2,536,524. In part, this mechanism comprises worm wheel 23 which is fast on a vertically disposed shaft 62, Figure 1, journalled in bearings 64 and 65, Figure 2, in the frame 20, the bearing 65 being adjustable and held in its adjusted position by means of a nut 67. Shaft 63 carries a pin 68 fixed therein. Mounted for vertical slidable movement on shaft 62, and having a slot 70 engaging the pin 68 is a clutch member 71 having clutch teeth 73. To initiate carriage return, the clutch member 71 is raised either manually or automatically, by means of a lever 74, in the usual manner, to engage the teeth 73 with cooperating teeth 76 of a gear 77, said gear being freely rotatable on shaft 62 and constantly in engagement with a carriage return rack 42. During the return of the carriage, the carriage tabulating rack 41, engaging the gear 40, rotates the upper body member 37 and plates 49 oppositely to the normal driving direction of rotation, and against the torque exerted by rotating plates 46. Therefore, immediately upon the disengagement of the clutch teeth 73 and 76, the carriage return movement is arrested, and tabulating movement of the carriage is initiated through the friction drive to position the carriage against the next succeeding tabulating stop.

The arrest of carriage 1 in a columnar position is cushioned by a dashpot as shown in Figures 1, 2 and 8. The carriage 1 carries a plurality of studs 79, Figure 1, which strike against a stop 80 to locate the columnar positions. Stop 80 is slidable on guides 82 on the frame and is connected to the forward end of a lever 85 pivoted on a fixed stud 86. At its rearward end lever 85 is connected by a link 88 to an arm of a cradle 89. Cradle 89 is pivoted on a bracket 91 fixed to frame 20, a spring 90 connected between the cradle 89 and bracket 91 acting, through cradle 89, link 88 and lever 85, to move stop 80 to the right in Figure 1. Another arm of cradle 89 is connected to the stem 92 of a conventional dashpot 93. When stud 79 on the carriage 1 strikes stop 80 and moves it to the left against the action of spring 90, the linkage through lever 85, cradle 89 and stem 92 actuates the dashpot 93 to smoothly arrest the carriage 1 at the desired location.

When the carriage arrives in the selected columnar position, it opens the circuit to motor 10 to prevent needless wear on the friction clutch. Referring to Figure 8, a pair of contacts 95 and 96 mounted on base 3 are connected in the circuit of motor 10, the arms of the contacts being formed to normally close the circuit and energize the motor. A slide 98 passing through an opening in base 3 and connected to cradle 89, is formed with an ear 99 resting over an extension of the contact arm 96. So long as the carriage stud 79 retains stop 80 to the left as in Figure 1, cradle 89 connected to stop 80 depresses slide 98 and opens contacts 95 and 96 to deenergize the motor circuit. When the carriage is released from stop 80, for either tabulation or carriage return, or accidentally, spring 90 acting through cradle 89, lifts slide 98 to permit the contacts 95, 96 to energize the motor 10 and drive the carriage in the tabulating or carriage return direction as required.

The above description is of a preferred embodiment of the invention and is not to be taken in a limiting sense as many modifications and alterations are possible without departure from the scope of the following claim.

What is claimed is:

A machine of the class described having a frame, a carriage mounted on said frame for longitudinal movement, a rack member secured to said carriage, a rotary power means, engageable means between said power means and said rack member, said means operable when engaged to positively drive said carriage in one direction, a constantly operative, friction drive means also connected between said power means and said rack member, said friction drive means impositively urging said carriage in the other direction and consisting of a first member driven by said power means, a second member having a gear connected to said rack member and a frictional torque transmitter means between said first and second members, a slidable stop member on said frame yieldably urged in one direction, a counter stop on said carriage engageable with said stop member during movement of said carriage in the other direction to arrest said carriage and means operated by said stop member when moved by said counter stop in said other direction to deenergize said power means.

References Cited in the file of this patent

UNITED STATES PATENTS 2,366,368    Sundstrand et al.    Jan. 2, 1945
2,635,732    Butler    Apr. 21, 1953